United States Patent [19]

McConnaughay

[11] 3,904,428

[45] Sept. 9, 1975

[54] PAVING COMPOSITION AND METHOD FOR MAKING IT

[76] Inventor: Kenneth E. McConnaughay, P.O. Box 1457, Lafayette, Ind. 47902

[22] Filed: Mar. 24, 1972

[21] Appl. No.: 237,666

Related U.S. Application Data

[63] Continuation-in-part of Ser. No. 37,982, May 18, 1970, abandoned.

[52] U.S. Cl. ................ 106/278; 106/273; 106/276; 106/277; 106/279; 106/283; 106/235; 106/238
[51] Int. Cl. .... C09d 3/24; C08h 13/00; C08h 17/02
[58] Field of Search ............. 106/235, 238, 273–284

[56] References Cited
UNITED STATES PATENTS

| | | | |
|---|---|---|---|
| 2,411,634 | 11/1946 | Pearson | 106/283 X |
| 2,626,875 | 1/1953 | McConnaughay | 106/277 X |
| 3,423,222 | 1/1969 | McConnaughay | 106/283 X |
| 3,556,827 | 1/1971 | McConnaughay | 106/279 |

OTHER PUBLICATIONS

"Colloid Science," A. E. Alexander and P. Johnson Oxford Press, 1950 pg. 585.

*Primary Examiner*—Joseph L. Schofer
*Assistant Examiner*—Herbert Lilling
*Attorney, Agent, or Firm*—Jenkins, Hanley & Coffey

[57] ABSTRACT

A paving composition and method of making it in which the binder is a bituminous gel formed by mixing in a colloid mill from about 83% to about 97% of a hot bituminous material with from about 2% to about 16% of water and from about .1% to about 11% of a gelling agent. The gel while in a heated state is mixed in a mixer with an aggregate at the rate of from about 3% to about 8% based upon the weight of the aggregate to form a paving composition.

3 Claims, 6 Drawing Figures

INVENTOR
KENNETH E. McCONNAUGHAY
BY
ATTORNEYS

PAVING COMPOSITION AND METHOD FOR MAKING IT

This application is a continuation-in-part of my copending application Ser. No. 37,982, filed May 18, 1970 and now abandoned.

BACKGROUND OF THE INVENTION

Bituminous emulsions used as binders in forming paving compositions are well known in the prior art and are in wide commercial use. The maximum limit of the bitumen that can be employed in such emulsions, however, is about 75 percent, as contrasted to a bitumen content of from about 83 percent to about 97 percent in my bituminous gel. Because of this difference in bitumen content, the gel sets up more quickly on the aggregate, has less tendency to drain off of wet aggregate, provides a more complete coating on certain types of aggregate, and the resulting paving composition can be more quickly compacted to thus make it more quickly available for traffic.

SUMMARY OF THE INVENTION

In accordance with one form of the invention, a binder is prepared by heating asphalt to about 250° F. and intimately milling it in a colloid mill with a water solution of a gelling agent at a temperature of about 75° F. to form a gel consisting of about 87 percent asphalt, 8 percent water, and 5 percent agent. The gel at a temperature of about 210° F. is then mixed with an aggregate to form a paving composition with the gel present in an amount equal to about 6 percent based upon the weight of the aggregate. Conveniently, the gel and aggregate are mixed together in a mixer having a hood thereover with the atmosphere in said mixer being heated to about 200° F. to further enhance the coatability of the gel on the aggregate.

BRIEF DESCRIPTION OF THE DRAWINGS

The accompanying drawings illustrate the invention. In such drawings.

DETAILED DESCRIPTION OF THE PREFERRED EMBODIMENT

Figure 1:
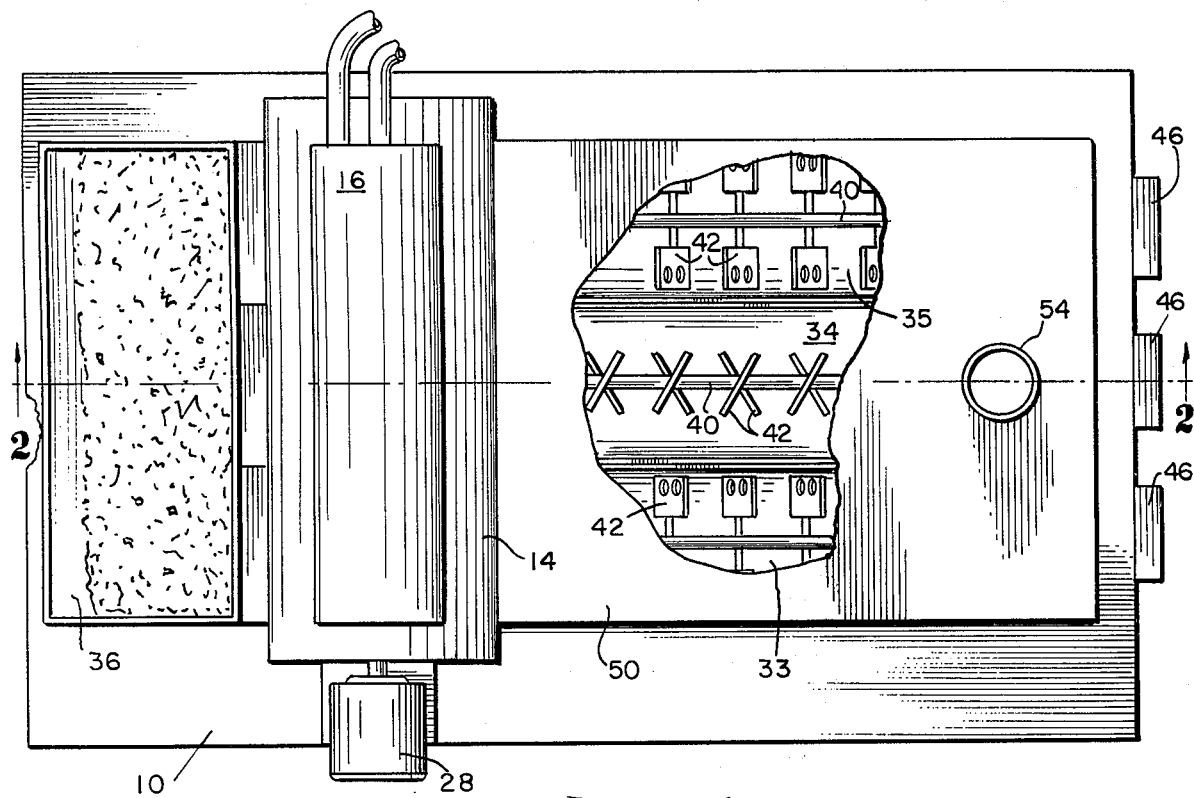
FIG. 1 is a plan view with portions thereof being broken away of an apparatus embodying the invention.

This invention is concerned with a paving composition employing an aggregate and a binder in the form of a bituminous gel and to the method and apparatus for making said composition. The bitumen in the gel may be pure asphalt, a mixture of asphalts, tar, pitch, and the like. The bitumen is heated to about 200° to 260° F. and milled in a mixer in the form of a straight-line mixer, colloid mill, or the like, with an aqueous solution of a gelling agent which may be at a temperature of from about 65° to about 100° F. The temperatures of the bitumen and solution of the gelling agent may vary, but it is necessary that the gel binder exit the mill at a temperature below 212°, desirably from about 160° F. to about 210° F. The gel exits the mill as an oil in water gel which is a viscous jelly-like mass having a composition comprised of from about 83 to about 97 percent bitumen, from about 2 to about 16 percent water, and from about 0.1 to about 11 percent gelling agent. It is to be understood that the mill employed in making the binder must mechanically break up the bitumen particles into colloidal size so that they are suspended in the water phase of the gel.

Immediately upon leaving the mill the gel is mixed with an aggregate which may be wet or dry. The amount of gel mixed with the aggregate may vary depending upon the end use of the paving composition. For most paving applications it is desirable to have from about 3 percent to about 8 percent bitumen, by weight, in the resultant paving composition. Examples of bitumen to aggregate ratios for various bitumen-based pavements are set forth in ASTM Specification D 1663-67.

If desired, the gel and aggregate can be mixed together in the presence of heat. For example, if the aggregate is wet, that is, having from 2 to 8 percent water, it is usually desirable to carry out the mixing in an atmosphere heated to about 1200° F. to drive off excessive moisture and insure a uniform coating of the binder on the aggregate, but in any event, the aggregate-binder mixture is never heated to a temperature above 350° F.

The gelling agents are soaps, either partially or fully saponified. A variety of such gelling agents can be employed in making the bituminous gel. For example, a mixture of rosin and fatty acids reacted with from about 4 to about 25 percent of a base, such as for example, NaOH, KOH, NH$_4$OH, or the like, can be employed. I have also achieved excellent results using a mixture of tall oil, and tall oil pitch reacted with from about 4 to about 10 percent of a base, such as for example, NaOH. A cationic gel can also be prepared using imidazoline, primary, secondary, tertiary, and quarternary amines, and mixtures thereof, reacted with from about 15 to about 30 percent of an acid, such as for example, HCl.

The process of making the paving composition may be carried out in an apparatus of the type shown in the drawings. Conveniently, such apparatus can be mounted in an elevated position on any type of suitable frame assembly 10. In the embodiment shown in FIGS. 1-3, a mixer 12 is supported on the frame 10 with a colloid mill 14 supported transversely across the mixer 12 adjacent one end thereof. A mixing manifold 16 is mounted on the mill 14.

The bitumen is introduced into the manifold 16 through a pipe 18 having a plurality of discharge outlets 19 longitudinally spaced along its length. The water solution of the gelling agent is also fed into the manifold 16 through a pipe 20 also having a plurality of longitudinally spaced discharge openings 21. The pipes 18 and 20 are connected to sources of heated bitumen and gelling agent solution, respectively. Conveniently, the pipes 18 and 20 may be connected to their respective sources of materials through a proportioning pump for feeding the desired proportions of the bitumen and gelling agent solution into the manifold 16. The bitumen and gelling agent solution are intimately mixed together in the manifold 16 and are discharged therefrom through an outlet 24 extending substantially the length of the manifold and in open communication with the upper end of the mill 14.

As shown, the mill 14 comprises a plurality of rotors 26 fixedly mounted in axially spaced relation along a shaft 27. The shaft 24 projects outwardly from one end of the mill and is connected thereat to a drive motor 28. A plurality of baffle plates 30 are fixedly mounted within the mill between adjacent rotors. Thus, the bitumen and gelling agent solution entering the mill 14 through the manifold discharge opening 24 are intimately mixed by the shearing action of the rotors 26, and with said materials in the proportional ranges described above, they will be discharged from the mill 14 in the form of a bituminous gel.

The mill 14 has an elongated discharge outlet 32 extending transversely across the mixer 12 adjacent one end thereof. As shown, said mixer comprises three elongated parallel beds 33, 34 and 35 identical in their construction and operation. An aggregate supply chute 36 extends transversely of the mixer 12 at the end thereof adjacent the mill 14. Like the mill outlet 32, the chute 36 is in open communication with the beds 33-35 so that both the aggregate and the gel will be introduced into each of the mixer beds at one end thereof.

As previously indicated, each of the beds is identical in its construction. Each has mounted therein a longitudinally extending shaft 40 having a plurality of mixing paddles 42 mounted thereon in radially and axially spaced relationship. Each shaft 40 projects outwardly from one end of the mixer 12 and is drivingly connected to a motor 44. Conveniently, the paddles 42 are arranged with respect to the shaft 40 so that they intimately mix the gel and aggregate together to cause said gel to form a uniform coating over the individual pieces of aggregate and to advance the thus coated aggregate along the length of the mixer bed to a discharge outlet 46 disposed at the end of the bed opposite the chute 36.

Figure 2:
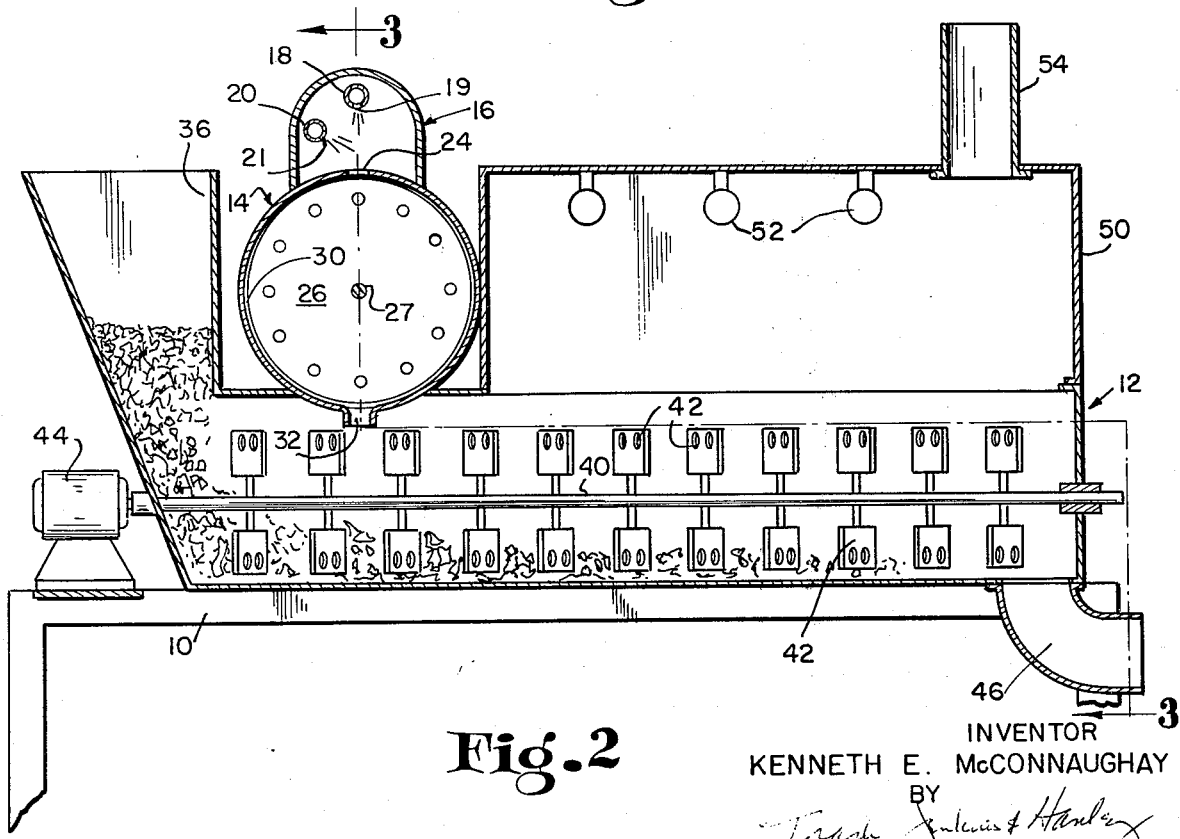
FIG. 2 is a vertical section taken on the line 2—2 of FIG. 1.
Figure 3:
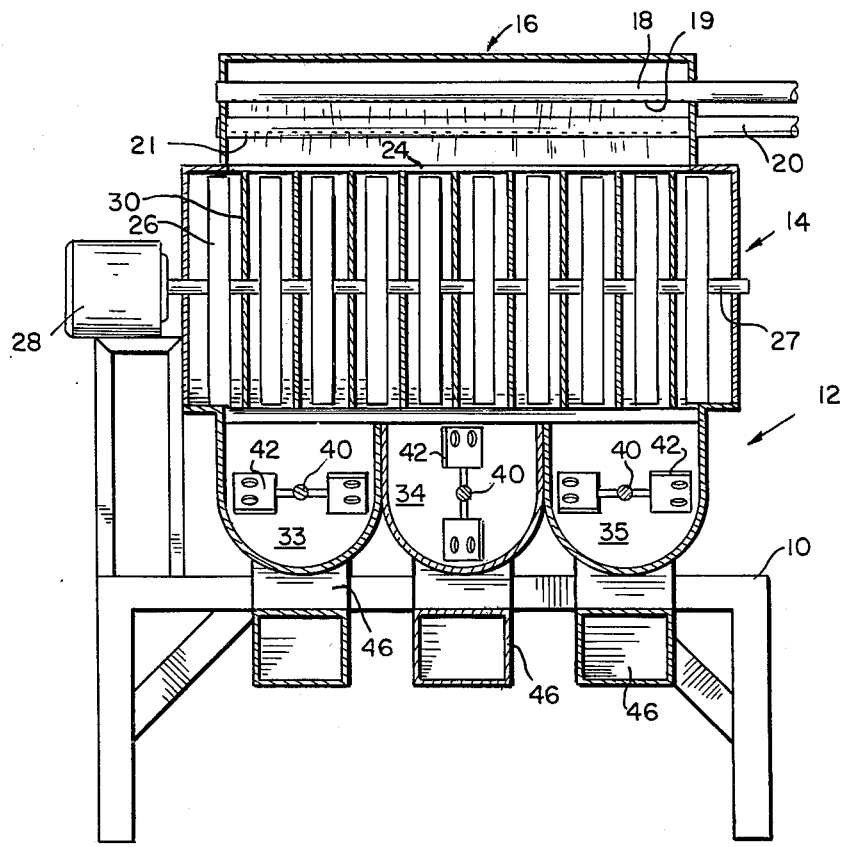
FIG. 3 is a vertical section taken on the line 3—3 of FIG. 2.

The apparatus illustrated in FIGS. 1–3 is provided with a hood 50 which extends over the mixer beds 33–35 between the mill 14 and the mixer end containing the discharge chutes 46. A plurality of burners 52 are mounted in the hood 50 for heating said mixer and thus the materials moving therethrough. Conveniently, the hood is provided with a stack 54 to carry off any moisture that is removed from the aggregate or gel being mixed in the beds 33–35.

It is contemplated that the process of producing the bituminous gel and the formation of the paving composition therewith will be carried out on a continuous basis. Thus, when an apparatus of the type shown in FIGS. 1–3 is employed, the aggregate will be continuously fed into the mixer beds 33–35 and the gel well be also continuously fed thereto with the resulting paving composition being withdrawn on a continuous basis from the discharge outlets 46.

Figure 4:
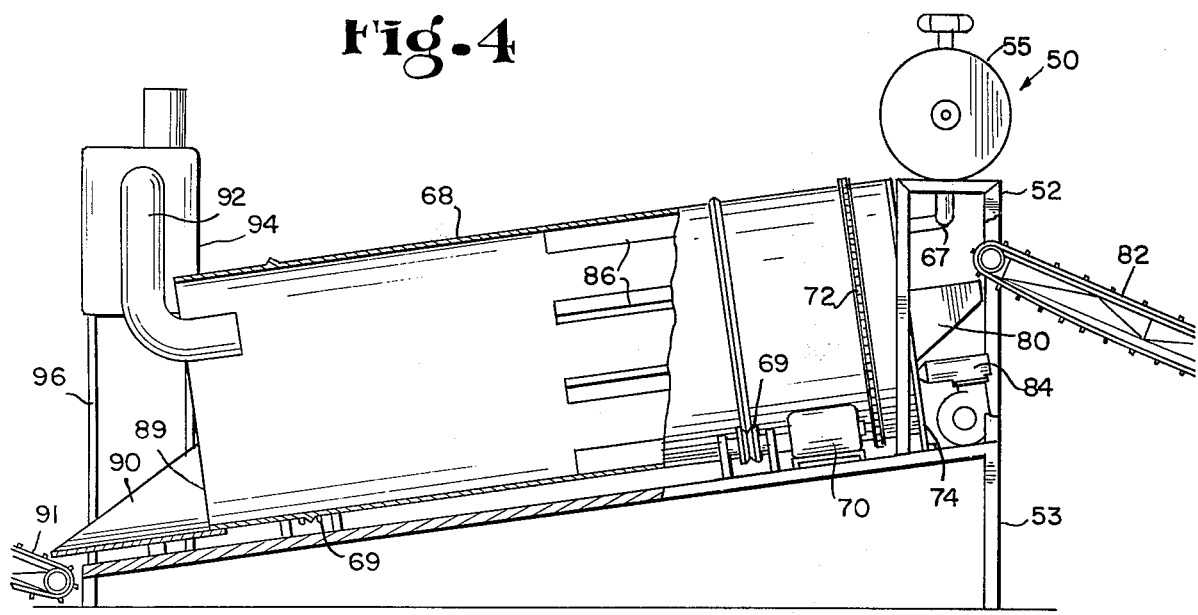
FIG. 4 is a side elevation of a modified form of the apparatus shown in FIG. 1, but with portions thereof being broken away.
Figure 5:
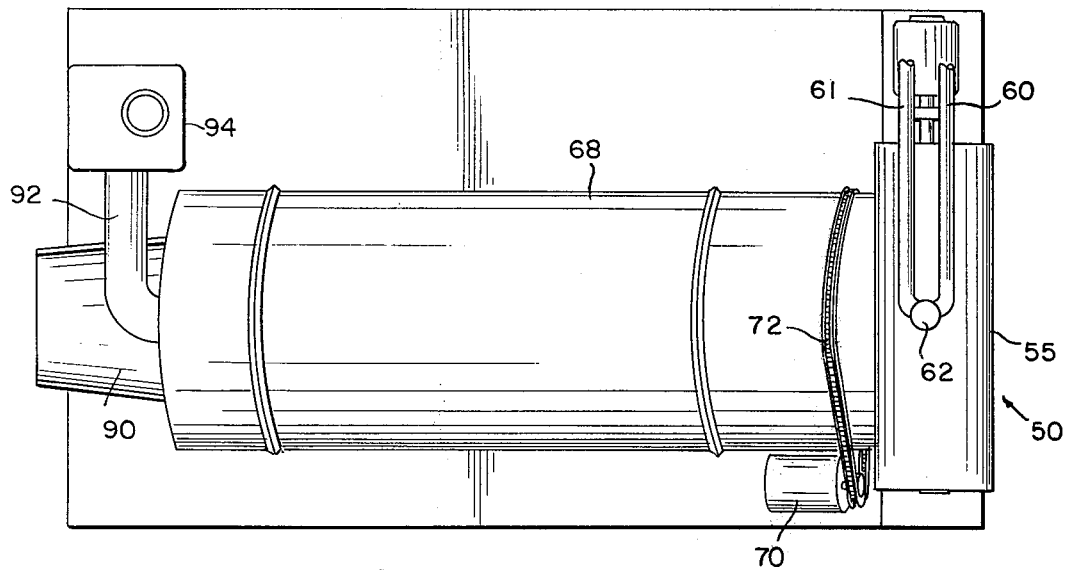
FIG. 5 is a top plan view of the apparatus shown in FIG. 4.
Figure 6:
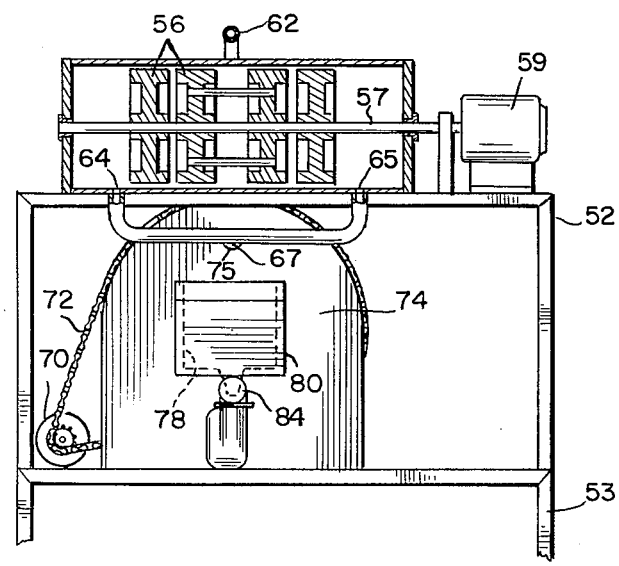
FIG. 6 is a vertical section taken on the line 6—6 of FIG. 4.

The apparatus illustrated in FIGS. 4–6 differs from that shown in FIGS. 1–3 primarily in the construction of the mixer for mixing the binder formed in the colloid mill with the aggregate. As shown, the mill 50 is carried on a standard 52 supported on a main supporting frame 53. Said mill is provided with an outer housing 55 having pairs of longitudinally spaced rotors 56 carried therein on a shaft 57. The shaft 57 projects outwardly from one end of the housing 55 and is connected to a drive motor 59 mounted on the standard 52. The binder-forming components are carried in conduits 60 and 61 which are joined together at the mill inlet 62 interposed between the most centrally disposed pair of rotors 56. Outlets 64 and 65 are disposed outwardly from the outermost pair of rotors 56 and are connected to a manifold 67 constituting the outlet for the mill 50.

Thus, the binder-forming materials enter the mill 50 through the inlet 62, and the rotors 56 mill the bituminous component of the binder into a colloidal particle size and mix it with the other components to form the binished binder. The binder is then discharged from the mill through the outlet conduits 64, 65, and 67. As shown, the outlet 67 is open to a mixer in the form of a drum 68 where said binder is mixed with an aggregate to form the finished paving composition. The drum is supported for rotation about an inclined axis by rollers 69 carried from the frame 53 and is rotated by an electric motor 70 connected to the drum by a chain drive 72.

A plate 74 is mounted on the frame 53 and extends upwardly therefrom to cover the inlet end of the drum 68. The upper end of plate 74 is provided with an opening 75 through which the binder is introduced into the drum through the mill outlet 67. Plate 74 has a second opening 78 through which aggregate is introduced into the drum from a hopper or chute 80 fed from a conveyor 82. As shown, a burner 84 is also mounted on frame 53 to direct a blast of flame into the drum 68 through the chute opening 78 in plate 74. If desired, the mill outlet 67, chute 80, and burner 84 can all feed into the drum 68 through a common opening in plate 74.

Thus, the binder and the aggregate are brought together adjacent the inlet end of the drum 68 for coating the aggregate with said binder. The aggregate is repeatedly elevated and dropped during rotation in the drum by a plurality of longitudinally extending vanes 86 mounted on the inner drum face. With the drum being disposed on an inclined axis, the aggregate and binder will be advanced through the drum toward the discharge end 89 of said drum where the finished paving composition will be discharged from said drum through a discharge chute 90 onto a conveyor 91. An exhaust stack 92 extends into the discharge end 89 of the drum for venting the gaseous materials from said drum. As shown, the stack 92 is connected to a knock-out drum 94 carried on a stand 96 supported from frame 53.

The following examples illustrate various paving compositions that have been prepared according to the invention.

EXAMPLE 1

An 85–100 penetration asphalt at a temperature of 250° F. was mixed with a water solution at 75° F. of a gelling agent consisting of a 50–50 mixture of rosin acids and fatty acids reacted with 18.5 percent KOH, based on the weight of the mixture. The asphalt and water solution were mixed by proportioning them into a colloid mixer to provide a gel discharged from the mixer at 205° F. and containing 87 percent asphalt, 5 percent gelling agent, and 8 percent water. The gel was then mixed with an aggregate in a mixer at ambient temperature at the rate of 115 pounds of gel per ton of aggregate to form an asphaltic surface mixture.

EXAMPLE 2

An 150–200 penetration asphalt at a temperature of 225° F. was mixed with a water solution at 100° F. of a gelling agent consisting of Hercules Power Company's Vinsol resin reacted with 10 percent NaOH, based on the weight of the resin. The asphalt and water solution were mixed by proportioning them in a colloid mill to provide a gel discharged from the mill at 200° F. and containing 84 percent asphalt, 4 percent gelling agent, and 12 percent water. The gel was then mixed with an aggregate at the rate of 105 pounds of gel per ton of aggregate to form a base mixture. The gel-aggregate mixture was mixed in a mixer in an environment heated to about 1200° F. with the mixture reaching a maximum temperature of about 230° F.

EXAMPLE 3

A paving tar (RT 12) at 230° F. was mixed with a water solution at 75° F. of a gelling agent consisting of a 50–50 mixture of rosin acids and fatty acids reacted with 15 percent NaOH, based on the weight of the mixture. The tar and water solution were mixed by proportioning them into a mixer to provide a gel discharged from the mixer at 190° F. and containing 85 percent tar, 6 percent gelling agent, and 9 percent water. The gel was then mixed with an aggregate at ambient temperature at the rate of 135 pounds of gel per ton of aggregate to form a tar concrete surface mix.

EXAMPLE 4

A cationic gel was prepared by pumping an 180 penetration asphalt at a temperature of 220° F. and a water solution of a gelling agent at 90° F. into a colloid mill. The gelling agent consisted of imidazoline reacted with 20 percent HCl. The asphalt and water solution were proportioned into the mill to provide a gel discharged therefrom at 185° F. and containing 95 percent asphalt, 0.5 percent gelling agent, and 4.5 percent water. The gel was then mixed in a mixer at ambient temperature with a granite aggregate at the rate of 135 pounds of gel per ton of aggregate to form a granite aggregate surface mix.

It is to be understood, of course, that additional materials, such as thickening agents, fibrous materials and the like, can be added to the paving composition, if desired.

I claim:

1. A method of making a paving composition comprising the steps of mechanically milling in a colloid mill a bituminous material selected from the class consisting of asphalt, mixtures of asphalt, tar, and pitch, and a water solution of a gelling agent in the form of a soap to produce a bituminous gel containing from about 83 to about 97 percent bituminous material milled into a colloidal particle size, from about 2 to about 16 percent water, and from about 0.1 to about 11 percent of said gelling agent, said bituminous material being at a temperature of from about 200° to about 260° F and said water solution being at a temperature of from about 65° to about 100° F when they are milled together, and mixing said gel while at a temperature of from about 160° to about 210° F with an aggregate to form a paving composition in which the aggregate is coated with the bituminous material in the gel.

2. The method as set forth in claim 1 in which said aggregate and gel are heated to a temperature not exceeding about 350° F. while they are mixed together.

3. A paving composition, comprising a mixture of an aggregate and from 3 to about 8 percent of an oil in water bituminous gel said gel containing from about 83 to about 97 percent of a bituminous material selected from the class consisting of asphalt, mixtures of asphalt, tar, and pitch and milled into a colloidal particle size, from about 2 to about 16 percent water, and from about 0.1 to about 11 percent of a gelling agent in the form of a soap which has been at least partially saponified.

* * * * *